Nov. 18, 1947.  S. SCHNELL  2,430,954
BLEEDING MECHANISM FOR HYDRAULIC BRAKES
Filed June 12, 1944  2 Sheets-Sheet 1
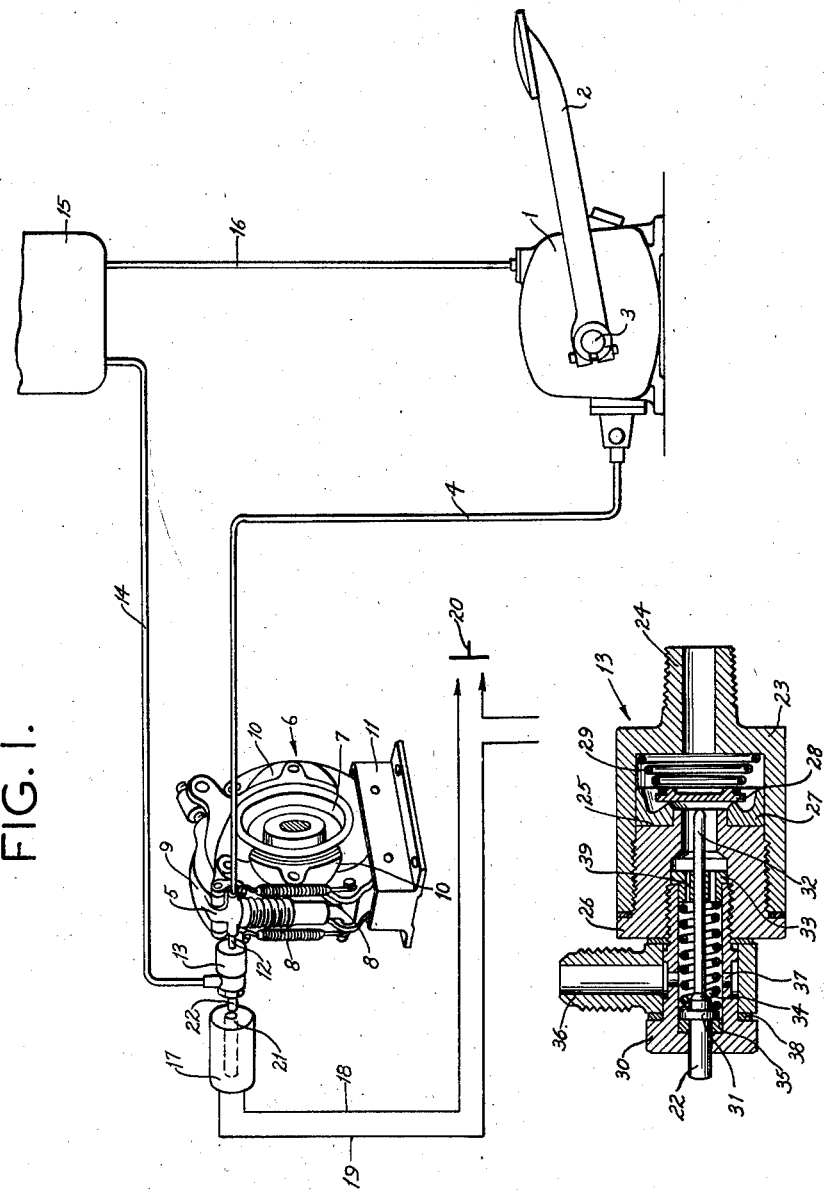
INVENTOR.
STEVE SCHNELL
BY
ATTORNEY.

Nov. 18, 1947.  S. SCHNELL  2,430,954
BLEEDING MECHANISM FOR HYDRAULIC BRAKES
Filed June 12, 1944  2 Sheets-Sheet 2
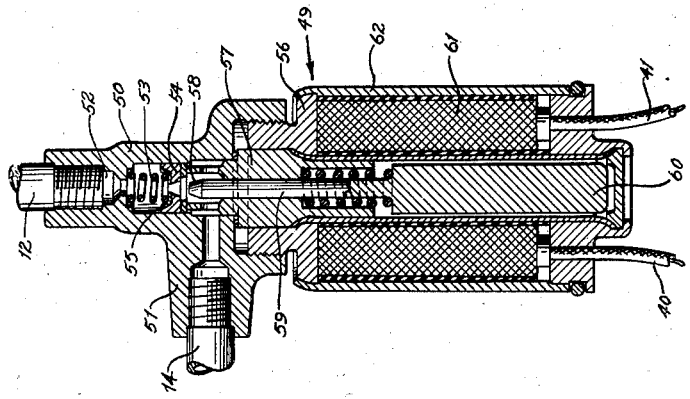
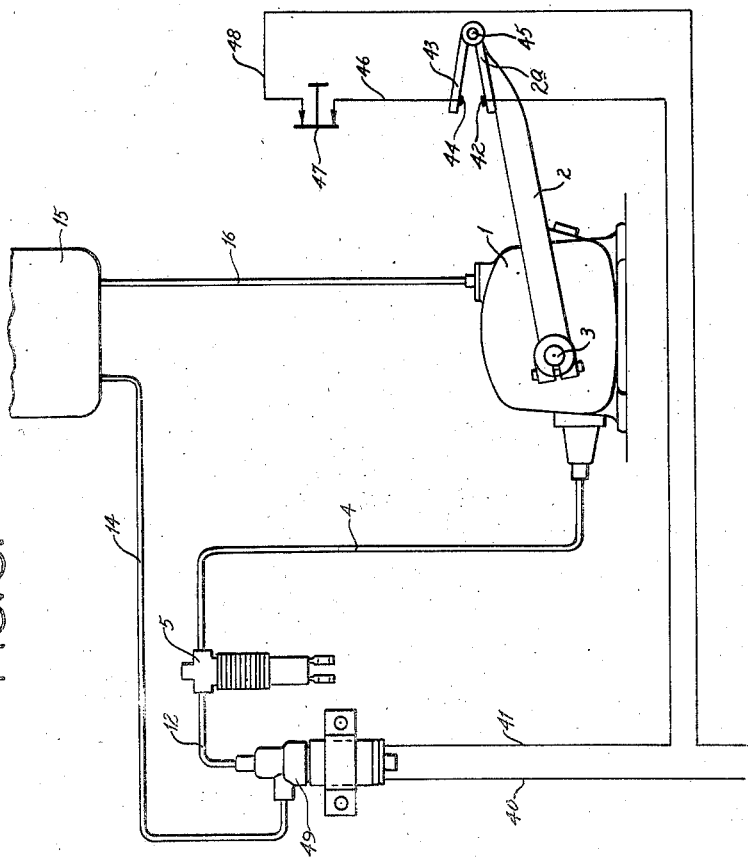
INVENTOR.
STEVE SCHNELL
BY
ATTORNEY.

Patented Nov. 18, 1947

2,430,954

UNITED STATES PATENT OFFICE 2,430,954

BLEEDING MECHANISM FOR HYDRAULIC BRAKES

Steve Schnell, Kirkwood, Mo., assignor to Wagner Electric Corporation, St. Louis, Mo., a corporation of Delaware Application June 12, 1944, Serial No. 539,857

4 Claims. (Cl. 60—54.5)

This invention is directed to brake controls and in its more specific aspects is concerned with a means and mechanism for controlling the bleeding of air from the pressure fluid line from a station or position remote from the brake cylinder.

An object of this invention is to produce a bleeding mechanism for pressure fluid brakes of the hydraulic type controllable from a position remote from the brake cylinder.

Another object of the invention is to provide a manually controlled bleeding means for hydraulic brakes operable from a station remote from the brake cylinder.

A further object of the invention is to provide a bleeder means for a hydraulically operated brake mechanism in which the bleeding is controlled from a station adjacent the master cylinder device.

A still further object of the invention is to provide in a hydraulic brake, a bleeder means electrically controlled in which the control switch is located at the operator's station for the brake.

A still further object of the invention is to provide a mechanism in a hydraulically operated brake wherein a solenoid operated valve controlled from a station adjacent the master cylinder device is employed to bleed any entrapped air from the brake system.

Another and still further object of the invention is to provide a substantially closed pressure fluid system for a hydraulic brake in which air and fluid bled from the brake cylinder is directed to an elevated reservoir.

Another and still further object of the invention is to provide in a hydraulic brake, a conduit system in which air is bled from the brake cylinder by a manually controlled means operable from a station adjacent the master cylinder and in which fluid in the brake system is continuously circulated and returned to an elevated supply tank.

Another and still further object of the invention is to provide a remotely controlled bleeder valve in a hydraulic brake in which the fluid and entrapped air released from the brake cylinder is led to an elevated supply tank.

A still further object of the invention is to provide a hydraulic brake system in which the operating portion thereof is maintained continuously filled with liquid.

Other and further objects of the invention will occur to those skilled in the arts to which this application pertains as the description proceeds, which, taken in connection with the accompanying drawings, set forth a preferred embodiment of the invention and selected modifications thereof but such disclosures are not to be construed as a limitation of the invention which is limited only by the appended claims and any and all modifications, alterations and variations of structure coming within the spirit and scope thereof are deemed to be included herein.

In the drawings:

Figure 1 shows a preferred embodiment of the invention;

Figure 2 shows a longitudinal section view of the bleeder valve;

Figure 3 shows a modified control circuit for the bleeder valve; and

Figure 4 shows a longitudinal section view of the bleeder valve and its operating solenoid.

Hydraulic brakes frequently have entrapped air in the pressure fluid lines leading to and in the brake cylinder that renders the operation thereof erratic and uncertain in character. Various devices have been developed to bleed such entrapped air from the conduits leading to the brake cylinder and from the brake cylinder and conduits connected thereto. Each of such devices is generally characterized by the fact that an operator or attendant must operate such bleeding devices right at the brake cylinder itself and further must provide an auxiliary vessel in order to collect any liquid which may escape along with the entrapped air. The most ideal operating condition for hydraulic brakes occurs when there is a line of hydraulic fluid between the master cylinder and the brake cylinder to thereby render the brake cylinder immediately responsive to any changes in the operating conditions imposed by the master cylinder. If the bleeder valves arranged on the brake cylinder must be opened at or near the cylinder, such operation is frequently delayed because of the difficulty in obtaining access to the brake cylinders. Applicant's invention eliminates the necessity of removing any operating mechanism on or adjacent to the brake device to bleed entrapped air from the brake operating system and is constructed and arranged such that the bleeding of air from the system may take place from the control station adjacent to the master cylinder operating the brake. Additionally, an auxiliary supply vessel for fluid is provided in an elevated position above the brake cylinder and any liquid and air exhausted from the brake cylinder and attached conduit is led to the elevated supply in order that the air may be eliminated at this point and any liquid carried along with the released air is collected in the elevated vessel. The invention provides a simple, efficient and effective means controlled from the brake operator station whereby entrapped air is bled from the pressure fluid brake operating mechanism.

The objects and advantages set forth above are obtained in the system disclosed in Figure 1 in which 1 is a master cylinder of conventional design, whose internal construction may be of the variety shown in United States Patent to Loughead No. 1,758,671, issued May 13, 1930, for Pressure mechanism for brake systems, operated by a foot pedal 2 that is pivotally mounted on a spindle 3 actuating a piston (not shown) arranged within a cylinder (not shown) in the instant device. Pressure fluid developed in the master cylinder is led by means of conduit 4 to one side of the brake cylinder 5 of the brake mechanism 6. Brake mechanism 6 comprises a rotatable element or drum 7 that is fixed to an appropriate rotatable element on a traveling crane, portable hoist or other vehicle as the case may be. The brake 6 is normally released and is retained in released position by means of springs 8—8. Lever 9 upon upward movement normally urges the shoe elements 10—10 pivoted to a base 11 into engagement with drum 7. This movement occurs when pressure fluid is admitted to brake cylinder 5 whereupon the springs are placed in tension and the brake shoes 10—10 are applied to the drum 7 to stop rotation of said drum. The brake drum is conventional in character and is well known to the arts.

Pressure fluid is exhausted from the brake cylinder 5 by conduit 12 that leads to a bleeder valve 13. Conduit 14 connects to the exhaust side of bleeder valve 13 and leads to a tank or sump 15, which vessel is preferably positioned above the level of brake cylinder 5 and master cylinder 1. Conduit 16 is led from tank 15 and supplies pressure fluid to a reservoir (not shown) provided in master cylinder device 1. The foregoing constitutes a substantially closed hydraulic circuit through which the pressure fluid may be circulated upon each actuation of the bleeder valve 13 and at no time after the opening of the bleeder valve 13 is it strictly necessary that the pressure fluid flow back to the master cylinder device through conduit 4.

Bleeder valve 13 is actuated by a solenoid 17 to which conductors 18 and 19 are connected and in one of which a manually controlled switch 20 is arranged. Conductors 18 and 19 lead to a suitable source of supply for the energization of the solenoid 17.

When the operator actuates the foot pedal 2 and discovers that there is entrapped air in conduit 4 and brake cylinder device 5, he closes switch 20, thereby energizing solenoid 17 whose armature 21 engages a plunger 22 in bleeder valve 13 to thereby open and said valve and allow any entrapped air contained in conduit 4 and brake cylinder 5 plus any liquid contained therein to escape to conduit 14 exhausting into tank 15 returning the air to the atmosphere and any fluid therein to said tank 15. Valve 13 is held open until the operator is certain a solid line of liquid is in the brake cylinder and conduits connected thereto.

The detailed construction of bleeder valve 13 is shown in Figure 2 in which a housing 23 preferably of circular form is provided having a reduced threaded end 24 that is adapted to be turned into one of the exhaust ports of brake cylinder 5 or may be threaded to a length of conduit 12 as illustrated in Figure 1. Within housing 23 a sealing cup 25, preferably formed from some highly resilient material of rubber-like characteristic, is arranged and held in said housing 23 by means of a retaining plug 26. The sealing cup 25 at its center is formed into a valve seat 27 engageable by the valve element 28 and a light spring 29 normally urges the valve 28 into engagement with seat 27 and also assists in maintaining the valve in its central position.

Threaded into plug 26 is another plug 30 that is counterbored and in said counterbore, plunger 22 is slidably arranged. In the larger diameter of the counterbore, an enlargement 31 is provided on said plunger 22 and beyond enlargement 31, the plunger has an extension 32 of reduced diameter that extends to a point adjacent the valve 28. The reduced diameter extension 32 of the plunger is supported in the bore of plug 30 by means of another bored plug 33, plug 33 being rigidly held in the larger bore of plug 30. A spring 34 is disposed above the reduced diameter portion 32 of the plunger between the enlargement 31 and plug 33 and urges the said plunger to the left as shown in Figure 2. A sealing element 35 is disposed about plunger 22 between the enlargement 31 and the end of the plug in order to prevent the escape of pressure fluid about said plunger 22.

The fitting 36 arranged about plug 30 connects with conduit 14 as illustrated and at its other end is connectable to the bore in housing 23. The fitting 36 is apertured to receive said plug 30 and the plug 30 is provided with a plurality of apertures 37 that lead to a groove 38 formed in the exterior of plug 30 in order that pressure fluid may be easily conducted from the bore in plug 30 to the bore in fitting 36. Plug 33 is appropriately apertured as at 39 in order to conduct the pressure fluid through said plug 33 and into the bore in plug 30. The foregoing structure provides the necessary passageways for the transmission of pressure fluid. Suitable gaskets are provided between the fitting and plug and between the plug 26 and housing 23 to eliminate any possibility of leakage of pressure fluid at those points.

The operation of the foregoing structure is thought to be clear but briefly consists of forcing the pressure fluid generated by the master cylinder device 1 to and through conduit 4 to the brake cylinder 5. Since valve 28 is maintained normally closed, the pressure fluid thus generated is applied to the brake cylinder to release the brake shoes from the brake drum 7. If any entrapped air is present in conduit 4 of brake cylinder 5, it is exhausted from the system by energizing the solenoid 17 upon closure of switch 20 located adjacent the master cylinder device 1. The energization of solenoid 17 causes its plunger 21 to engage plunger 22 urging the same toward the right against the tension of spring 34 such that the reduced end 32 of the plunger engages valve 28 lifting it from seat 27 and allowing fluid to escape around the valve 28 into the bore of plug 26 through apertures 39, the bore in plug 36, apertures 37 and thence through the bore in fitting 36 through conduit 14 and into the elevated tank or sump 15. Upon release or opening of switch 20, the solenoid is de-energized and spring 34 will restore plunger 22 to the position indicated and spring 29 will again reseat valve 28 on seat 27 of cup element 25 whose normal function is to prevent the escape of pressure fluid and hold the same within the bore provided in housing 23. If, after master cylinder 1 is inoperative, should a vacuum be created in brake cylinder 5, gravitational action will urge liquid in conduit 14 to open valve 28, allowing liquid to re-enter brake cylinder 5, thereby maintaining said system full of liquid.

In the selected modification of the above described mechanism set forth in Figures 3 and 4, the basic elements of master cylinder 1, foot pedal 2 on spindle 3, conduit 4, brake cylinder device 5, conduit 14, and tank or sump 15 function in exactly the same manner as set forth above and the same reference numerals apply to each of these parts.

The control circuit for the bleeder valve is differently arranged in the modification and comprises the power line 40 leading to a source of supply line 41, the latter of which is connected to a contact 42 fixed in the pad 2a on foot pedal 2. A pivoted contact supporting lever 43 having a contact 44 fixed thereon is supported on spindle 45 and is maintained in a condition such that the contacts 42 and 44 remain out of engagement. A conductor 46 connects contact 44 with one side of a switch 47 and the other side of switch 47 by means of conductor 48 leads to an appropriate power source.

Bleeder valve 49 is connected between conduit 14 and brake cylinder 5 by means of conduit 12 or it may be directly connected to the brake cylinder, comprising initially a housing 50 internally threaded at its reduced end to receive conduit 12 and is provided with another interiorly threaded extension 51 into which conduit 14 is threaded. The housing 50 is provided with a double counterbore 52 into one side of which the conduit 12 is secured and in the other side of which the spring 53 is arranged such that it engages with a valve seat element 54 provided with a sealing cup 55, the valve seat 54 being slidable in the bore of housing 50.

Threaded into an enlarged extension of housing 53 is a fitting 56 in which is arranged a counterbored element 57, one end of which fits into one of the counterbores in housing 50 and having a reduced end 58 engaging with the valve seat 54. Within the counterbore of fitting 56, the valve element 59 is slidably received and is rigidly secured to a plunger element 60 operable by solenoid coil 61. Spring 62 is arranged in the larger of the counterbores in fitting 56 and engages with solenoid plunger 60 to open bleeder valve 49 upon de-energization of coil 61. The valve seat 54 and valve 59 are appropriately seated and shaped to provide a fluid-tight connection therebetween and sealing cup 55 is normally intended to prevent the escape of pressure fluid from the bore provided in housing 50. The reduced end 58 of fitting 56 is appropriately apertured in order that pressure fluid may pass from the bore in housing 53 toward the conduit 14. Suitable provision is made for the insulation of plunger 60 from coil 61 and gasket elements are provided in the valve assembly wherever the possibility of leakage of pressure fluid may occur.

In the operation of this device the operator places his foot upon the element 43 and pivots it about spindle 45 to bring elements 44 and 42 into contact, thereby closing the circuit to coil 61 and simultaneously operating master cylinder 1. The energization of coil 61 causes plunger 60 to advance and closes bleeder valve 49 by having the valve element 59 firmly engaged with valve seat 54. In the event that air is entrapped in brake cylinder 5 or conduits 4 and 12, switch 47 is opened, thereby opening the circuit to coil 61 de-energizing the same such that spring 62 may open the valve 49 and allow any entrapped air to pass through valve 49 and accompanying liquid through conduit 14 into elevated tank or source 15 allowing the air to escape to atmosphere. During any period of inaction valve 49 is open and should any vacuum be developed in brake cylinder 5, liquid from sump 15 will flow from sump or tank 15 to fill conduit 14, valve 49, conduit 12, brake cylinder 5 and any space in conduit 4 to maintain a solid line of liquid between the master cylinder and brake cylinder 5.

Having fully described my invention, what I claim as new and desire to secure by Letters Patent of the United States is:

1. In a brake system, a master cylinder, a brake cylinder, and a sump, said sump positioned above said brake cylinder; a bleeder valve to remove entrapped air from said brake cylinder; a solenoid to operate said bleeder valve; means to control the energization of said solenoid to open and close said bleeder valve including a switch disposed adjacent said master cylinder to enable the operator to control said valve from the position remote therefrom; and a switch associated with said master cylinder to de-energize said solenoid when said master cylinder is not operating.

2. In a brake system, a master cylinder, a brake cylinder, and a sump serially connected; a bleeder valve connected between said sump and said brake cylinder; a solenoid to control said valve; a switch associated with said master cylinder; a circuit including said switch to control said solenoid, said circuit closable upon actuation of said master cylinder to thereby close said bleeder valve; and another switch openable to deenergize said coil and enable said bleeder valve to bleed entrapped air and other fluid from said brake cylinder to said sump.

3. In a brake control system, the combination of a brake cylinder; a master cylinder; a liquid reservoir; means to serially connect each of said devices into a substantially closed hydraulic circuit; a bleeder valve in said circuit so connected as to exhaust entrapped air into said reservoir; electrically operated means for operating said bleeder valve; and a circuit for said electrically operated means which includes a normally closed manual switch and a normally open switch closable when said master cylinder is operated.

4. In a brake control system, the combination of a master cylinder having an operating pedal pivoted thereto; a brake cylinder; a liquid reservoir; means to connect each of said devices into a substantially closed hydraulic circuit; a bleeder valve in said circuit arranged such that it is enabled to exhaust entrapped air and other fluid in said brake cylinder into said liquid reservoir; a solenoid to operate said bleeder valve; and a circuit for said solenoid which includes a normally closed manually operated switch and a normally open switch on said pedal closable when said pedal is depressed.

STEVE SCHNELL.

REFERENCES CITED

The following references are of record in the file of this patent:

UNITED STATES PATENTS

| Number | Name | Date |
|---|---|---|
| 616,756 | Williamson | Dec. 27, 1898 |
| 1,051,768 | Rumold | Jan. 28, 1913 |
| 1,230,150 | Geraghty | June 19, 1917 |
| 1,709,150 | Pieper | Apr. 16, 1929 |
| 1,758,671 | Loughead | May 13, 1930 |
| 1,985,812 | Banas | Dec. 25, 1934 |
| 2,014,338 | Messier | Sept. 10, 1935 |
| 2,058,063 | Cox | Oct. 20, 1936 |
| 2,184,501 | Loweke | Dec. 26, 1939 |
| 2,185,277 | Stelzer | Jan. 2, 1940 |
| 2,349,791 | Johnson | May 23, 1944 |

FOREIGN PATENTS

| Number | Country | Date |
|---|---|---|
| 412,876 | Great Britain | July 5, 1934 |